United States Patent [19]

Lakin

[11] Patent Number: 4,644,204
[45] Date of Patent: Feb. 17, 1987

[54] MOTOR HOUSING AND END SHIELD MOUNT

[75] Inventor: Bryan L. Lakin, Springfield, Mo.

[73] Assignee: Fasco Industries, Inc., Boca Raton, Fla.

[21] Appl. No.: 805,877

[22] Filed: Dec. 6, 1985

[51] Int. Cl.$^4$ .............................................. H02K 5/04
[52] U.S. Cl. ...................................... 310/89; 310/42; 403/285
[58] Field of Search ............. 29/596; 310/40 MM, 42, 310/89, 254, 258, 259; 403/282, 284, 285, 274

[56] References Cited

U.S. PATENT DOCUMENTS

| | | |
|---|---|---|
| 2,701,318 | 2/1955 | Feiertag ................................. 310/89 |
| 3,037,822 | 6/1962 | Plummer . |
| 3,061,746 | 10/1962 | Hansen . |
| 3,081,411 | 3/1963 | Wiley . |
| 3,176,379 | 4/1965 | Brown . |
| 3,289,018 | 11/1966 | Schaefer . |
| 3,313,968 | 4/1967 | Kaiser . |
| 3,320,660 | 5/1967 | Otto . |
| 3,343,013 | 9/1967 | Wightman . |
| 3,437,853 | 4/1969 | Arnold . |
| 3,450,907 | 6/1969 | Blume . |
| 3,463,949 | 8/1969 | Stone . |
| 3,483,409 | 12/1969 | Phillips . |
| 3,489,934 | 1/1970 | Lewis . |
| 3,518,471 | 6/1970 | Wightman . |
| 3,544,820 | 12/1970 | Wightman . |
| 3,555,320 | 1/1971 | Johnson . |
| 3,567,973 | 3/1971 | Mastrodonato . |
| 3,639,790 | 2/1972 | Yatsushiro . |
| 3,676,725 | 7/1972 | Wiser . |
| 3,707,037 | 12/1972 | Gutris . |
| 3,714,705 | 2/1973 | Lewis . |
| 3,732,616 | 5/1973 | Mastrodonato . |
| 3,794,869 | 2/1974 | Apostoleris . |
| 3,859,548 | 1/1975 | Morley . |
| 3,884,385 | 5/1975 | Schaefer . |
| 3,891,878 | 6/1975 | Dochterman . |
| 3,932,930 | 1/1976 | Dochterman . |
| 4,017,964 | 4/1977 | Schulte . |
| 4,076,989 | 2/1978 | Watson . |
| 4,110,644 | 8/1978 | Roddy . |
| 4,118,644 | 10/1978 | Schulte . |
| 4,164,674 | 8/1979 | Buckman . |
| 4,174,485 | 11/1979 | Soden . |
| 4,199,861 | 4/1980 | Buckman . |
| 4,259,603 | 3/1981 | Uchiyama .............................. 310/90 |
| 4,309,815 | 1/1982 | Schmitt . |
| 4,315,176 | 2/1982 | Sendo . |
| 4,441,042 | 4/1984 | Colwell . |
| 4,471,246 | 9/1984 | Paillet . |

FOREIGN PATENT DOCUMENTS

| | | | |
|---|---|---|---|
| 2411622 | 9/1975 | Fed. Rep. of Germany ........ 310/89 |
| 2727452 | 12/1978 | Fed. Rep. of Germany ........ 310/89 |
| 2061775 | 5/1981 | United Kingdom .................. 310/89 |

Primary Examiner—Patrick R. Salce
Assistant Examiner—D. L. Rebsch
Attorney, Agent, or Firm—Rogers, Howell, Moore & Haferkamp

[57] ABSTRACT

A housing for an electric motor includes a cylindrical sleeve and an end shield in the form of a circular disk that fits within the sleeve. The sleeve has tabs that extend inwardly and define stops to locate the end shield in one axial direction and position it perpendicular to the longitudinal axis of the sleeve. The end shield has circumferentially spaced recesses at the outer edge and in the outer surface thereof. The sleeve has protrusions that extend into the end shield recesses with the end shield positioned against the stops. The protrusions and recesses cooperate to locate the end shield in the other axial direction and secure it against rotational movement relative to the sleeve, whereby the end shield is firmly secured perpendicular to the longitudinal axis of the sleeve against both axial and rotational movement.

13 Claims, 7 Drawing Figures

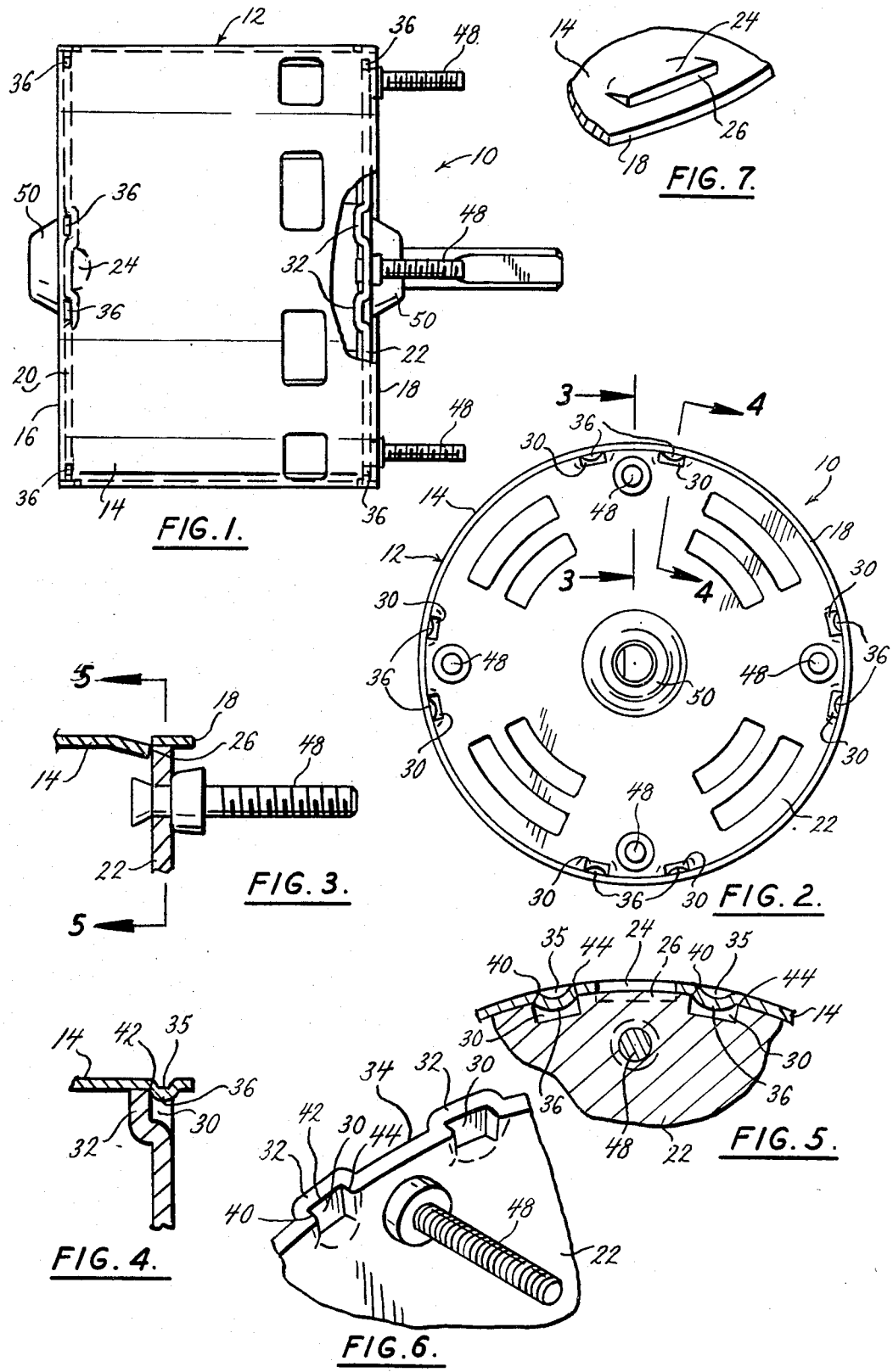

MOTOR HOUSING AND END SHIELD MOUNT

BACKGROUND AND SUMMARY OF THE INVENTION

This invention relates to a housing for an electric motor or the like and method for forming the housing, and more specifically to a housing where the structure for securing the end shields to the housing sleeve allows for automated assembly without sacrifice of quality.

Electric motors, and particularly fractional horsepower motors, must be of quality construction to give long service, and yet must be made efficiently and at low cost. The alignment and positioning of the end shields relative to the sleeve are critical. The end shields must be parallel to each other, and perpendicular to the longitudinal axis of the sleeve. The spacing between the end shields must be accurate as typically the end shields provide the mounts for the rotor bearings. Misalignment or improper spacing of the end shields severely shortens the life of the motor.

The savings of labor and material are also crucial. This invention is specifically directed to a structure for accurately securing the end shields to the sleeve of a motor housing without the use of separate fasteners, and such that the assembly of these parts may be fully automatic.

There have been numerous techniques for securing end shields to the sleeve of a motor. These have included welding, the use of separate clips or fasteners, tie rods, and the like. However, such techniques have been either labor intensive, required extra parts or fasteners, or failed to provide accurate or secure mounting of the end shields to the sleeve.

There are known techniques for attaching the end shields and sleeve without the use of extra parts. One such technique is disclosed in Feiertag U.S. Pat. No. 2,701,318. With the Feiertag structure, the end shield is axially located by its engagement with the end of the sleeve. This means that the length of the sleeve must be exactly dimensioned, and the ends must be exactly parallel and perpendicular to the longitudinal axis of the sleeve, within reasonable tolerances, because the end shields are positioned by their engagement against the ends of the sleeve.

Mastrodonato U.S. Pat. Nos. 3,567,973 and 3,732,616 disclose structures where lances are formed near the edge of the sleeve and act to locate the end shield longitudinally therein. Segments adjacent slots are bent radially inwardly to hold the end shield axially in place. Notches 20 and portions 22 secure the end shield rotationally, relative to the sleeve. Hence, Mastrodonato uses separate means for securing the end shield axially and circumferentially, requiring additional manufacturing operations and material.

Schaffer U.S. Pat. No. 3,884,385 discloses notches at the ends of the sleeve and locating tabs at the edge of the end shield to locate the end shield circumferentially. Holding tabs formed at the edges of the sleeve hold the end shield axially. The formation of the locating tabs at the edges of the end shield requires extra material, and the holding tabs must be relatively thin so that they may be bent over against the locating tabs.

The end shield mounting structure and method of the present invention overcome the disadvantages of these prior techniques. Generally, in accordance with the invention, the sleeve is lanced near its ends to provide tabs that extend radially inwardly and have surfaces that define stops against which the end shields are positioned. These stops are spaced from the ends of the sleeve so that the end shields fit within the sleeve either flush with the ends or slightly inset therefrom. The tabs act to locate the end shields axially in one direction. Each end shield has circumferentially spaced recesses at its outer edge and in its outer surface. These recesses may be formed in a forming die or by staking. Also, the sleeve is staked near its ends to produce protrusions that extend radially inwardly and into the recesses of the end shields, with the end shields positioned against the tabs. These protrusions cooperate with the recesses to locate the end shields against movement in the opposite axial direction, and secure them against rotation relative to the sleeve.

The tabs are formed by lancing and can be very accurately positioned to ensure that the end shields are properly spaced and aligned. The recesses and protrusions are also accurately located and sized so that the protrusions firmly engage the outer edges of the recesses and securely lock the end shields in position against both axial and rotational movement relative to the sleeve.

Hence, this invention provides a very accurate and secure mounting of the end shields and sleeve, without the need for separate fasteners, and with minimal waste of material. The assembly may be performed using fully automated techniques with the protrusions formed after the end shield is positioned against the tabs. The invention also allows for repair of the motor after assembly by punching the protrusions back out to remove the end shield. Assembly produces minimal disturbance of pre-painted surfaces to reduce assembly time and cost.

These and other objects and advantages of the invention are apparent from the description to follow.

DESCRIPTION OF THE DRAWINGS

FIG. 1 is a side elevation view of an electric motor including a motor housing with an end shield attachment in accordance with the present invention;

FIG. 2 is a right end view of the motor of FIG. 1;

FIG. 3 is a view in section taken generally along the line 3—3 of FIG. 2;

FIG. 4 is a view in section taken generally along the line 4—4 of FIG. 2;

FIG. 5 is a view in section taken generally along the line 5—5 of FIG. 3;

FIG. 6 is a perspective view of a portion of an end shield near the edge thereof and showing recesses therein for attaching the end shield in accordance with the invention; and FIG. 7 is a perspective view from the inside of a portion of the sleeve of the housing sleeve near an end of the housing and showing a locator tab in accordance with the invention.

DETAILED DESCRIPTION OF THE PREFERRED EMBODIMENT

With reference to the drawing, there is shown an electric motor 10 having a housing 12 constructed in accordance with the present invention. The housing includes a cylindrical sleeve 14 of circular cross section with ends 16 and 18. At the ends of the sleeve are end shields 20 and 22. Each end shield is essentially a circular disk that fits snuggly within the sleeve at an end thereof.

To secure each end shield to the sleeve both axially and rotationally relative to the sleeve, the sleeve has tabs 24 circumferentially spaced about the sleeve near its ends. In this described embodiment, at each end there are four such tabs equally spaced about the sleeve, although a fewer or greater number of such tabs could be used. It is preferred that there be at least three such equally spaced tabs. The tabs at each end of the sleeve extend radially inwardly and have end surfaces 26 that face generally in an axially outwardly direction. The tabs 24 are formed from the material of the sleeve by deforming the material using a lancing operation.

The end shields are positioned within the sleeve against the surfaces 26 of the tabs. Hence, the tabs act as stops to locate the end shields to prevent them from moving inwardly in the axial direction. The tabs are accurately located so that with the end shields positioned against the surfaces 26, the end shields are parallel to each other and perpendicular to the longitudinal axis of the sleeve. In other words, the contact areas of the tabs against which the end shields are positioned lie on planes that are perpendicular to the longitudinal axis of the sleeve. This assures that the end shields are properly located and aligned, and there is no need to precisely size the sleeve or precisely square its ends.

Each end shield has circumferentially spaced recesses 30 in its outer surface. These recesses are formed in the end shield by a staking operation or forming die which deforms the material of the end shield, creating protrusions 32 at the inside surface of the end shield, and the recesses or pockets 30 in the outside surface. Preferably, there are recesses equally spaced about the edge of the end shield, and there should be at least three such equally spaced recesses. In this described embodiment, the recesses are located in pairs, there being a pair of recesses corresponding to each tab 24. The recesses in each pair are spaced circumferentially apart a sufficient distance such that the surfaces 34 between the protrusions 32 are of sufficient length that they may seat solidly against the tabs without interference by the protrusions.

The sleeve has dimples 35 defining protrusions 36 corresponding to the recesses. Hence, in the described embodiment, there are a pair of protrusions 36 corresponding to each tab, the protrusions 36 of each pair being circumferentially spaced and located at opposite sides of a tab. The protrusions 36 are formed from the material of the sleeve by deforming the material using a staking operation.

The protrusions 36 extend into the end shield recesses with the end shields positioned against the tabs. The recesses 30 and protrusions 36 are sized such that the lower surface of the protrusions firmly engage the outer edges 40, 42, and 44 of the recesses so that the end shields are prevented from rotating and moving axially outwardly relative to the sleeve. In this way, the end shields and sleeve are very tightly secured together.

The end shield may also include pins 48 for mounting the motor, bearing sockets 50 for mounting suitable bearings for supporting the rotor, and other structure commonly associated with end shields.

To assemble the housing of this invention, the end shields are staked or formed to form the recesses 30. At least one end of the sleeve is not lanced until after the stator of the motor is inserted into the sleeve as otherwise the tabs would interfere. Then, with the stator in place, the one or both ends of the sleeve, not previously lanced, is lanced so that tabs are now at both ends of the sleeve. With the other motor components including the rotor within the sleeve, the end shields are placed in position against the tabs, and the sleeve is staked at both ends to form the protrusions 36 and firmly secure the end shields in place against both axial and rotational movement relative to the sleeve. If desired, after one end of the sleeve is lanced, an end shield may be assembled to that end of the sleeve at any time.

The components of the housing may be prepainted, with little disturbance of the prepainted surfaces during assembly. Also, as each motor must undergo electrical testing requiring a ground connection to bare metal of the housing, the edges of the lanced tabs 24 provide the bare metal for the connection. If an assembled motor is in need of repair, the motor can be disassembled by punching out the protrusions 36 which allows removal of an end shield.

It is readily apparent that no separate fasteners are required to assemble the sleeve and end shields in accordance with this invention, and there is minimal waste of material as there are no tabs that must protrude axially from the edges of the end shields in order to secure the end shields against rotation relative to the sleeve. The end shield mounting structure allows for assembly using automated techniques.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A housing for an electric motor or the like, the housing comprising a cylindrical sleeve and an end shield, said end shield being in the form of a circular disk that fits within the sleeve at an end thereof, said sleeve having means extending inwardly and defining stops to locate the end shield in one axial direction, and position the end shield perpendicular to the longitudinal axis of the sleeve, said end shield having circumferentially spaced recesses at the outer edge and in the outer surface thereof, and said sleeve having protrusions extending into the end shield recesses and engaging the sides thereof with the end shield against said stops, the protrusions and recesses cooperating to locate the end shield in the other axial direction and positively secure it against rotational movement relative to the sleeve, whereby the end shield is firmly secured perpendicular to the longitudinal axis of the sleeve against both axial and rotational movement relative thereto.

2. The housing of claim 1 wherein said inwardly extending means of the sleeve further comprise circumferentially spaced tabs extending inwardly and having surfaces defining said stops.

3. The housing of claim 2 wherein said tabs are formed by lancing.

4. The housing of claim 1 wherein said recesses in said end shield are formed by staking.

5. The housing of claim 1 wherein said recesses in said end shield are formed by a forming die.

6. The housing of claim 3 wherein said sleeve protrusions are formed by staking.

7. The housing of claim 2 wherein there are at least three such tabs equally spaced circumferentially about the sleeve, and wherein the tab surfaces for positioning the end shield in the one axial direction are located axially away from the end of the sleeve to allow the end shield to fit within the sleeve.

8. The housing of claim 7 wherein said tabs are formed by lancing the end shield at locations spaced from an end of the sleeve.

9. The housing of claim 7 wherein there are at least three such recesses spaced circumferentially about the outer edge of the end shield, and at least three such protrusions equally spaced circumferentially about the sleeve.

10. The housing of claim 9 wherein there is a recess located circumferentially at each side of each tab, and there is a protrusion located circumferentially at each side of each tab that extends into a mating recess.

11. A housing for an electric motor, the housing comprising a cylindrical sleeve and an end shield at each end thereof, each end shield being in the form of a circular disk that fits within the sleeve at one end, said sleeve having tabs formed by lancing at each end, the tabs extending inwardly and having surfaces defining stops to locate the end shields in the inward axial direction and position the end shields perpendicular to the longitudinal axis of the sleeve and accurately space the end shields apart, each end shield having circumferentially spaced recesses at the outer edge and in the outer surface thereof, and said sleeve having protrusions at each end extending into the end shield recesses and engaging the sides thereof with the end shield against said stops, the protrusions and recesses formed by deforming the material of the sleeve and end shields and cooperating to locate the end shields in the outward axial direction and positively secure them against rotational movement relative to the sleeve, whereby the end shields are firmly secured against both axial and rotational movement relative to the sleeve and accurately located perpendicular to the longitudinal axis of the sleeve and accurately spaced apart in parallel relation to each other.

12. The housing of claim 11 wherein there are at least three such tabs equally spaced circumferentially about the sleeve, and three such protrusions and recesses equally spaced circumferentially about the sleeve and each end shield.

13. The housing of claim 12 wherein there is a recess located circumferentially at each side of each tab, and there is a protrusion located circumferentially at each side of each tab that extends into a mating recess.

* * * * *